US008460784B2

(12) United States Patent
Jennings et al.

(10) Patent No.: US 8,460,784 B2
(45) Date of Patent: Jun. 11, 2013

(54) DIGITAL IMAGE TRANSFER BELT AND METHOD OF MAKING

(75) Inventors: Jeffrey D. Jennings, Hendersonville, NC (US); Allen Shannon, Waynesville, NC (US); Richard Czerner, Weaverville, NC (US)

(73) Assignee: Day International, Inc., Plymouth, MI (US)

(*) Notice: Subject to any disclaimer, the term of this patent is extended or adjusted under 35 U.S.C. 154(b) by 141 days.

(21) Appl. No.: 12/841,369

(22) Filed: Jul. 22, 2010

(65) Prior Publication Data

US 2011/0176841 A1 Jul. 21, 2011

Related U.S. Application Data

(60) Provisional application No. 61/228,311, filed on Jul. 24, 2009.

(51) Int. Cl.
*B32B 27/06* (2006.01)
*B32B 33/00* (2006.01)
*G03G 15/16* (2006.01)
*B05D 7/04* (2006.01)

(52) U.S. Cl.
USPC .................. 428/319.3; 428/319.7; 428/315.7; 428/306.6; 428/131; 399/297; 264/173.11; 264/154; 264/156; 264/104; 427/407.1

(58) Field of Classification Search
USPC .......... 428/315.5, 315.7, 306.6, 318.4, 319.3, 428/319.7; 399/297; 427/407.1; 264/173.11, 264/104, 154, 156
See application file for complete search history.

(56) References Cited

U.S. PATENT DOCUMENTS

| | | | | |
|---|---|---|---|---|
| 5,428,429 | A | 6/1995 | Fletcher | |
| 5,576,818 | A | 11/1996 | Badesha et al. | |
| 5,899,610 | A | 5/1999 | Enomoto et al. | |
| 6,042,917 | A | 3/2000 | Schlueter, Jr. et al. | |
| 6,096,684 | A | 8/2000 | Sasaki et al. | |
| 6,173,152 | B1 * | 1/2001 | Schlueter et al. | 399/328 |
| 6,245,402 | B1 * | 6/2001 | Schlueter et al. | 428/58 |
| 6,514,650 | B1 | 2/2003 | Schlueter, Jr. et al. | |
| 7,311,966 | B2 | 12/2007 | Yao et al. | |
| 2004/0086305 | A1 * | 5/2004 | Stulc et al. | 399/308 |
| 2005/0127333 | A1 | 6/2005 | Onuki et al. | |
| 2008/0038566 | A1 | 2/2008 | Cody et al. | |

FOREIGN PATENT DOCUMENTS

JP 2007292849 11/2007

OTHER PUBLICATIONS

International Search Report and Written Opinion dated Nov. 2, 2010 pertaining to International application No. PCT/US2010/043026.

* cited by examiner

*Primary Examiner* — Hai Vo
(74) *Attorney, Agent, or Firm* — Dinsmore & Shohl LLP

(57) ABSTRACT

An image transfer belt is provided for use in digital printing applications which includes a base film layer having perforations therein which are filled with a conductive polymer layer to provide controlled conductivity to the belt. The belt further includes a compliant layer over the conductive polymer layer. The resulting belt exhibits electrical properties suitable for digital image transfer. These properties may be varied according to the desired application.

21 Claims, 2 Drawing Sheets

DIGITAL IMAGE TRANSFER BELT AND METHOD OF MAKING

CROSS-REFERENCE TO RELATED APPLICATIONS

This application claims the benefit of U.S. Provisional Application No. 61/228,311, filed Jul. 24, 2009, entitled DIGITAL IMAGE TRANSFER BELT AND METHOD OF MAKING. The entire contents of said application is hereby incorporated by reference.

BACKGROUND OF THE INVENTION

The present invention relates to an image transfer belt and a method of making such a belt for use in digital printing applications, and in particular, to an image transfer belt including a base film layer having perforations therein which are filled with a conductive polymer to provide controlled conductivity to the belt.

Digital imaging systems are widely used in the fields of xerography and electrography where dry or liquid toner is used to print text and graphic images. For example, systems which use digitally addressable writing heads to form latent images include laser, light-emitting diode, and electron beam printers. Copiers use optical means to form latent images. Regardless of how the latent images are formed, the images are inked (or toned), transferred, and then fixed to a paper or polymer substrate.

Digital imaging systems typically include a component such as an image transfer belt (ITB) which is utilized for latent image recording, intermediate image transfer (transfer of a toner image to the belt followed by transfer to a substrate), transfusing of toner (transport of the unfused image onto the belt with subsequent fusing), contact fusing, or electrostatic and/or frictional transport of imaging substrates such as paper, transparencies, etc.

As image transfer belts play a critical role in the imaging or substrate transport process, they must be engineered to meet exacting standards. For example, the belts must be flexible and seamless, or carefully seamed such that the seams do not interfere with image transfer. In addition, the digital printing industry also requires image transfer belts having controlled electrical conductivity and high surface planarity to achieve good image quality. Most printing applications require that the conductivity be controlled in both the dimension normal to the belt plane as well as along the belt plane.

Typical image transfer belts in use comprise a polyimide film which includes an electrically conductive material such as carbon black dispersed in the polymer. Such a polyimide film may comprise either the sole belt layer or may be used as a load bearing base layer for a compliant rubber surface layer and/or release coatings. However, a disadvantage of the use of polyimide films in image transfer belts is that they are expensive to manufacture, whether produced in a seamless loop or purchased as a web and converted to a loop through a seaming process.

Accordingly, there remains a need for an image transfer belt which exhibits controlled conductivity and which is economical to produce.

SUMMARY OF THE INVENTION

Embodiments of the invention meet those needs by providing an image transfer belt utilizing a base layer comprising a film which has been perforated or microperforated to provide numerous pores which are filled with a conductive polymer to provide the desired electrical conductivity to the belt. The belts are low in cost to manufacture and exhibit comparable electrical resistivities (conductivities) to conventional belts which utilize conductive polyimide films.

According to one embodiment of the invention, an image transfer belt for digital printing applications is provided including a base layer which comprises at least one porous film having first and second surfaces with a plurality of pores therein. At least a portion of the pores extend through the entire thickness of the base layer. A conductive polymer layer on the first surface of the base layer at least partially fills the pores. A compliant layer is formed over the conductive polymer layer.

In one embodiment, the conductive polymer layer forms a continuous layer on the first surface of the base layer. In another embodiment, the conductive polymer layer forms a continuous layer on the second surface of the base layer. By "on," we mean directly next to an adjacent layer with no intermediate layers. By "over," we mean that at least a portion of a major surface of one layer lies in direct or indirect contact with a portion of the major surface of the other layer.

The base layer is preferably selected from polyester, polyethylene, polypropylene, polyethylene terephthalate (PET), polyethylene-naphthalate (PEN), polyethylene imine, nylon, polyimide, polyphenylenesulfide (PPS), polycarbonate, and polyetherimide (PEI). The base layer may comprise multiple film layers and preferably has a thickness of between about 0.001 and about 0.005 inches (about 0.025 to about 0.130 mm).

The pores in the base layer comprise perforations or microperforations and preferably have a pore density of between about 85 to about 200 pores/$cm^2$, and a pore diameter of from about 10 to about 200 microns.

In one embodiment, the conductive polymer layer comprises an elastomer or thermoplastic polymer. The conductive polymer layer optionally includes a conductive additive therein. In an alternative embodiment, the conductive polymer may comprise an inherently conductive material.

The compliant layer may also comprise an inherently conductive material. The compliant layer may also include an electrically conductive additive therein. The compliant layer preferably has a thickness of between about 0.003 and about 0.025 inches (0.08 to 0.64 mm).

The conductive layer or compliant layer is preferably selected from silicones, rubbers, polyurethanes, fluorosilicones, fluorocarbons, EPDM, ethylene-propylene copolymers, elastomers, and blends thereof.

In one embodiment of the invention, a release layer is included over the compliant layer to provide controlled surface properties for efficient transport and release of toner or ink images. The release layer preferably comprises a fluoropolymer resin.

In the method of making the image transfer belt, a base layer is provided comprising at least one film having first and second surfaces. The base layer is perforated to provide a plurality of pores therein, at least a portion of which extend therethrough. A conductive polymer layer is provided on the first surface of the base layer which at least partially fills the pores, and a compliant layer is provided over the conductive layer.

The method preferably further includes providing a release layer over the compliant layer. The image transfer belt may be manufactured so that it is seamless, i.e., provided in a continuous loop.

The resulting digital image transfer belt preferably has a volume resistivity of between about $1\times10^3$ and about $1\times10^{11}$ ohm-cm. By providing a belt including a porous base film, a conductive polymer which fills the pores of the base layer, and a compliant layer, the belt provides the capability to match the electrical requirements of a specific application/printer without requiring the use of high cost polyimide films which have to be customized for the specific electrical requirements of a particular application.

Accordingly, features of the present invention include providing an image transfer belt which is low in cost to manufacture and which exhibits controllable electrical conductivity properties. These, and other features and advantages of the present invention, will become apparent from the following detailed description, the accompanying drawings, and the appended claims.

DETAILED DESCRIPTION OF PREFERRED EMBODIMENTS

Embodiments of the image transfer belt of the present invention provide several advantages over prior image transfer belts comprised of polyimide films. The use of a porous film base layer filled with a conductive polymer is less expensive than the use of a polyimide film, yet provides electrical resistivity or conductivity properties that are comparable to belts comprised of polyimide films. In addition, the construction of the belt allows the electrical characteristics of the belt to be easily tailored to meet electrical requirements for specific imaging applications. The belt may be produced in seamless form, or as a web where individual belts are cut and seamed to form a continuous belt. For example, the belt may be constructed on a mandrel onto which the base layer film and conductive polymer are applied or a web carrier may be used which comprises, for example, a continuous steel band or a continuous film loop.

Figure 1:
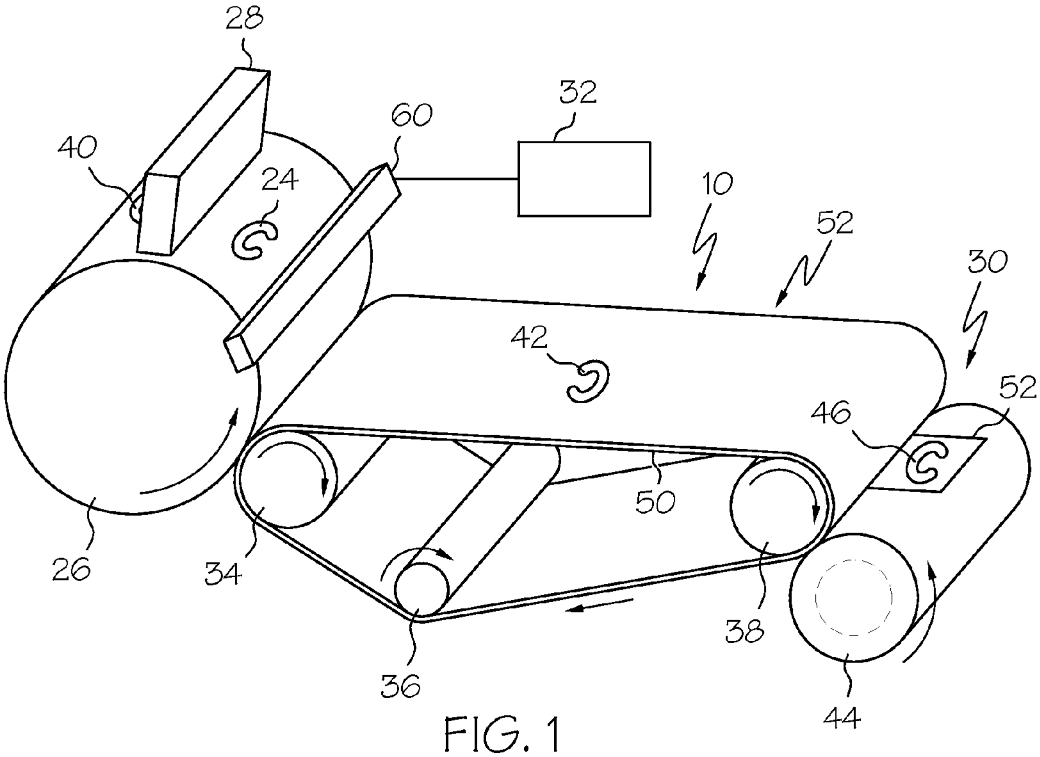
FIG. 1 is a perspective view of one embodiment of the image transfer belt mounted on rotational rollers.
Figure 2:
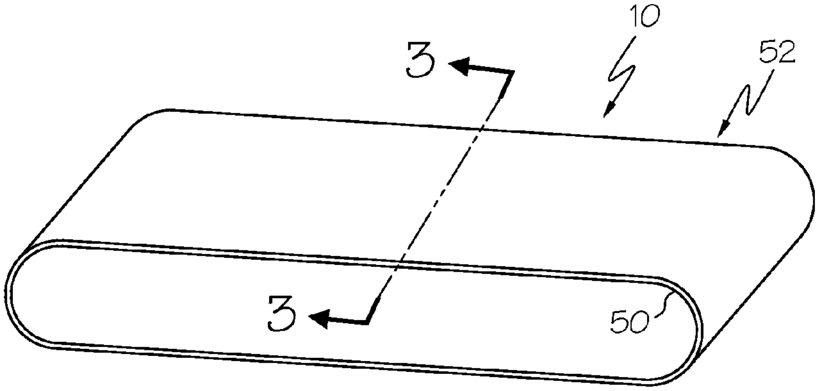
FIG. 2 is a perspective view of one embodiment of the image transfer belt.

Referring now to FIGS. 1 and 2, a belt made according to the present invention is illustrated having a seamless, uniformly flat structure. The belt 10 can have a first edge 50 and a second edge 52. In the embodiment shown in FIG. 1, the belt 10 can be used for intermediate image transfer. In other applications, the belt may be used on a recording drum such as the recording drum 26 shown in FIG. 1. As shown in FIG. 1, a computer 32 can control the formation of a latent image 24 via writing head 60 (such as a laser or LED, for example) onto a recording drum 26. The latent image electrostatically attracts dry toner from a toner cartridge 28 to form a toned, unfused image 40. This image can then be transferred to the belt 10 in the form of intermediate image 42. The belt may be driven by rollers 34, 36 and 38 which advance the intermediate image through a transfusing nip 30 where heat and pressure is applied to simultaneously transfer and fuse the toner image onto a substrate 52 which can be synchronously and frictionally advanced by fusing roller 44 and belt 10 to form the final, fused image 46. It should be appreciated that latent image 24, unfused image 40, intermediate image 42, and fused image 46 are shown in such a way as to better illustrate the sequence of steps involved informing an image. For example, in the actual process, transfer and fusing of image 46 onto substrate 52 actually occurs at nip 30. The above-described process can also be adapted for use with liquid toner. Further, it should be appreciated that belt 10 may be used in another embodiment of the transfer process illustrated in FIG. 1 in which rollers 34 and 38 provide electrical fields that act upon belt 10 and the toned image to cause transfer of the image. Thereafter, image 46 may be fused to the substrate in a subsequent step as is conventional in many digital printing machines.

Figure 3:
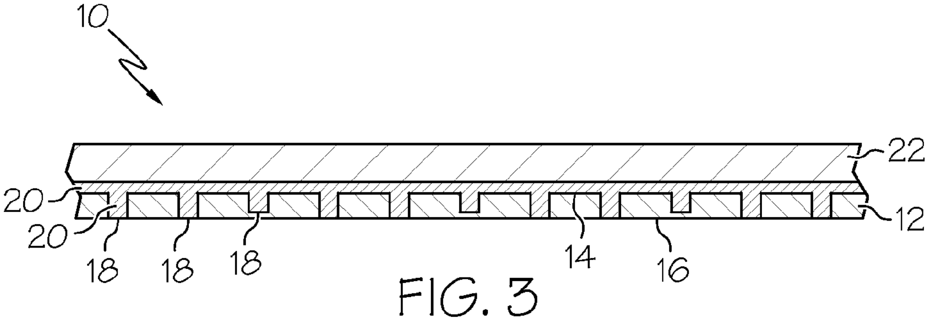
FIG. 3 is a cross-sectional view taken along lines 3-3 of FIG. 2 according to an embodiment of the image transfer belt.
Figure 4:
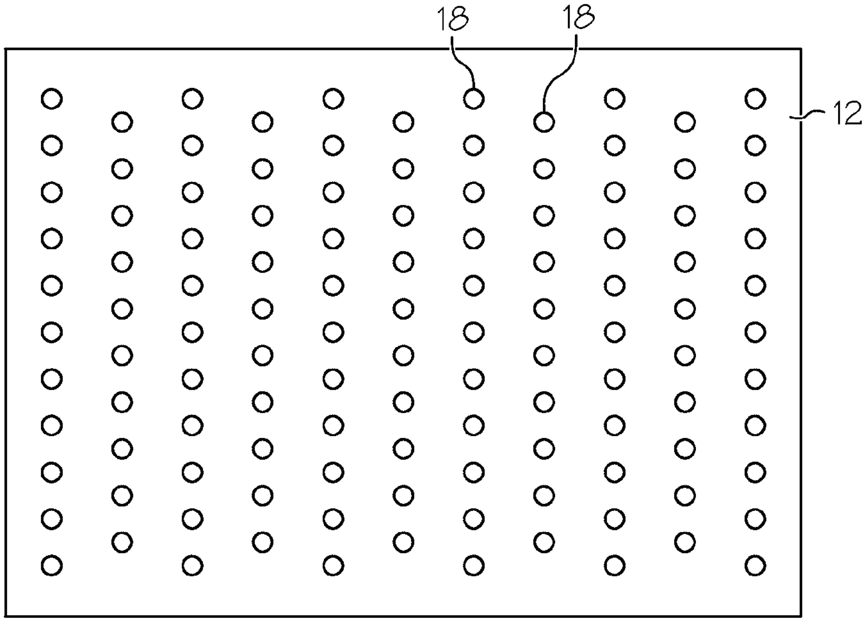
FIG. 4 is a perspective view of an embodiment of a perforated base layer for use in the image transfer belt.
Figure 5:
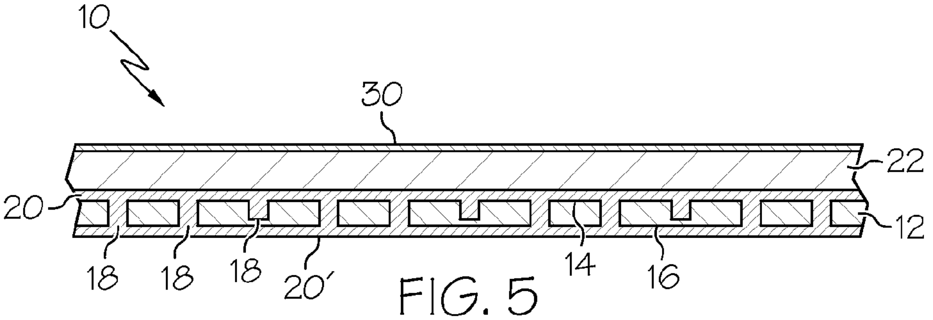
FIG. 5 is a cross-sectional view of another embodiment of the image transfer belt.

Referring now to FIGS. 3-5, embodiments of the image transfer belt 10 are shown. As shown in FIG. 3, the belt 10 includes a base layer 12 having first and second surfaces 14 and 16. In the embodiments illustrated in FIGS. 3 and 4, base layer 12 includes pores in the form of perforations or microperforations 18, at least some of which extend completely through the first and second surfaces. Preferably, at least 25% to 100% of the pores extend through the first and second surfaces.

The belt further includes a conductive layer 20, which, in the embodiment shown, fills the perforations 18 and forms a continuous layer over the base layer 12. The conductive layer may also penetrate the pores through to the second surface 16 of the base layer 12 so as to form a continuous layer on the second surface as shown in FIG. 5. As shown, the conductive layer forms a uniform inner surface 20' for the belt. A compliant layer 22 is over the conductive polymer layer 20.

The base film layer 12 may comprise any conductive or non-conductive polymer which exhibits sufficient temperature resistance and electrical stability. It should be appreciated that "sufficient" temperature resistance and electrical stability varies according to the application and printer design operating conditions. For example, printers vary in capability to adjust for electrical changes that result from changes in temperature and relative humidity. When used in printers that do not have the capability to control temperature and relative humidity, the belt must remain dimensionally stable, must retain sufficient strength to resist stretching under the tensile load needed to transport the belt in the printer, and must not vary in electrical resistivity beyond the capability of the printer to adjust for various electrical ranges. In practice, the tension loads in such printers are typically in the range of about 2 to about 4 lbf per inch of width. At these loads, and at temperatures that typically do not exceed 150° F., the belt must not stretch more than about 0.2%, and it must be able to return to its original dimensions when the tension force and elevated temperature are removed. In practice, the belt is typically acceptable for most printer designs if the electrical resistivity does not change by more than a factor of ten over the range of 20% RH at 70° F. to 80% RH at 100° F.

In preferred embodiments, base film layer 12 comprises a polyester film, polyethylene terephthalate (PET), polyethylene naphthalate (PEN), polyethylene imine (PEI), polyphenylene sulfide (PPS), nylon, polycarbonate, or polyetherimide (PEI). While embodiments of the invention generally do not employ polyimide, it should be appreciated that polyimides may be used, including less expensive conductive or non-conductive grades of polyimide film. The polyimide films may include additives such as carbon black to control electrical properties. Other types of films such as high density polyethylene and polypropylene may also be used.

It should be appreciated that multiple layers of the base film layer 12 may be used to achieve the desired belt properties such as thickness, stiffness, and tensile strength. In instances where multiple film layers are used, the layers are preferably adhered together by the conductive polymer that saturates the pores. The film may also be pretreated with adhesion promoters such as acrylics or corona treatments.

The base film layer preferably has a total thickness ranging from about 0.001 inches to about 0.005 inches (0.025 to about 0.013 mm).

The perforations or microperforations 18 in the base layer may be produced by any number of methods that are well known for perforating polymer films, including, for example, using a pin roller. Such a roller includes metal pins projecting therefrom. Other suitable methods include, but are not limited to, hot pins, hot air jets, a laser, or high pressure water jets. The base layer may be temporarily adhered to a backing layer such as a rubber pad to aid in penetration where a pinning roller is used. The spacing of the perforations or microperforations in the film may vary, depending on the desired application for the belt. The majority of the perforations should preferably penetrate completely through the film layer(s), and do not need to be regularly spaced and/or aligned. The perforations may also be random in their placement as long as the pore density and average pore diameter values are maintained, and as long as a path is created in which the conductive material which is applied to one or both surfaces in a subsequent step penetrates completely through the holes to form a conductive path from one surface of the film to the other surface, thus providing electrical continuity between the first and/or second surfaces of the base film layer. The pore density is preferably from about 85 to about 200 pores/cm$^2$, and the pore diameter ranges from about 10 to about 200 microns.

After the perforations/pores are provided in the base layer, the conductive layer 20 is applied over base layer 12 such that the pores are partially or fully wetted, and such that portions of the conductive polymer extend to at least a portion of inner surface of the base layer as shown in FIG. 5. The conductive polymer may be applied by a number of methods including, but not limited to, spreading thin solvated polymer layers, spreading thin layers of non-solvated pre-polymer, laminating calendered sheeting, flow coating, spray coating or centrifugal casting.

The thickness and conductivity of layer 20 may be controlled to provide a desired electrical conductivity. The thickness of conductive layer 20 is preferably at least equal to the perforated film thickness and the volume resistivity should be in the range of about $10^8$ to $10^{11}$ ohm-cm. In a preferred embodiment, the conductive layer thickness is about 12 microns to about 100 microns, with a total thickness (perforated film plus surrounding/saturating polymer) of about 25 microns to about 150 microns, and a volume resistivity of about $5\times10^8$ to about $5\times10^{10}$ ohm-cm.

In certain applications, the resistivity of the conductive layer should be similar to the resistivity of the compliant layer in order to optimize print performance and print quality. In other applications, the belt should be comprised of layers having different conductivities/resistivities. It should be appreciated that the conductivity of the layers may vary according to the desired printing application.

For example, in certain printing applications, the surface resistivity of the innermost belt layer must be controlled independently of the resistivity of the entire belt. For such applications, the conductivity of the base layer is limited and may be different than the conductivity of the compliant layer. The conductivity and thickness of the compliant layer should be adjusted relative to the conductivity and thickness of the base layer and the pore size and spacing in the base layer to provide a uniform electrical field at the outer surface of the belt. In one preferred embodiment, the belt may comprise a perforated polyester film having a volume resistivity of $1.0\times10^{18}$ ohm-cm saturated with a conductive layer having a volume resistivity of $1\times10^{10}$ to $1\times10^{12}$ ohm-cm, and a compliant nitrile/epichlorohydrin layer having a volume resistivity of $1\times10^8$ to $1\times10^{10}$ ohm-cm.

The conductive layer 20 may be comprised of the same polymer as the base layer or may be different. Typically, the conductive layer comprises an elastomer or thermoplastic polymer. Suitable elastomers include EPDM rubber, such as Vistalon™, commercially available from Exxon Mobil, nitrile rubber such as Paracril from Insa, fluorosilicone rubber such as Xiameter® from Dow Corning, fluorocarbon rubber, such as Viton® from DuPont, ethylene propylene rubber such as Buna® EP from Lanxess, silicon rubber such as Silastic®, available from Dow Corning, and polyurethane, such as PF from Polaris Polymers. Suitable thermoplastic polymers include thermoplastic acrylic resins, for example, Paraloid™, available from Rohm and Haas, a thermoplastic polyvinylbutyral resin such as Butvar, available from Solutia, a thermoplastic cellulosic resin such as cellulose acetate butyrate, available from Eastman, and a thermoplastic polyester resin such as Dynapol™, available from Degussa Evonik.

The conductive layer may include a conductive additive therein to provide the desired electrical conductivity. Suitable additives include carbon black or other additives such as quaternary ammonium salts, polyaniline, polypyrrole, polythiophene, carbon nanotubes, silver nanofibers, and silver coated pigments. Such additives may be incorporated into the polymer by conventional mixing and compounding methods practiced in the art. It should be appreciated that the amount of additives used may vary, depending on the desired electrical conductivity for a particular application.

Alternatively, the conductive layer 20 may comprise polymers or blends of polymers, plasticizers, or salts that are inherently conductive, such as, for example, epichlorhydrin, polyaniline, polyglycolether such as Vulkanol® KA (commercially available from Lanxess, pentaerythritol ester such as Hercoflex® 600 (commercially available from Hercules, Inc.), and chlorides or bromides of iron, copper or lithium.

The compliant layer 22 is then coated or bonded over the conductive layer. The compliant layer may comprise the same material as the conductive layer 20 or may be different than the conductive layer. Adhesives are typically not needed, but a conventional adhesive may be used to aid in bonding when adhering dissimilar layers as long as the adhesive includes additives therein which will cause the adhesive to match the conductivity of one or more of the adjacent layers.

Examples of suitable compliant layer materials include, but are not limited to, rubbers such as nitrile-butadiene rubber (NBR), epichlorohydrin rubber (ECO), polyurethanes, silicones, fluorosilicones, fluorocarbons, EPDM (ethylene-propylene diene terpolymers), EPM (ethylene-propylene copolymers), polyurethane elastomers, and blends thereof.

The compliant layer should be soft and flexible enough to provide good image transfer, capable of withstanding printing conditions, including electrical fields, and should be conductive at the level required for good image transfer. Preferably, the compliant layer has a Shore A hardness of about 30 to 80, and more preferably, from 40 to 60. The compliant layer preferably has a volume resistivity of from about $1\times10^3$ to $1\times10^{11}$.

As shown in FIG. 5, the belt may further include an optional release layer 30 over the compliant layer. The release layer provides controlled surface properties for efficient transport and release of toner or ink images. The release layer 30 may by applied by coating or casting and preferably comprises a fluoropolymer resin. Suitable fluoropolymer resins include, for example, polyvinylidene fluoride (PVDF), fluorinated ethylene propylene (FEP), perfluoroalkoxy (PFA), and fluorosilicones. In addition, hydroxyl-functional fluoropolymers that can be reacted with other polymers such as isocyanates, urea-formaldehyde, melamine-formaldehyde crosslinkers, etc. may be used, for example, Lumiflon® L-200 from Asahi Glass Co. and Sinofon® FEVE from Asambly Chemicals Co. In addition, there are fluorinated acrylated materials that can be used to make release coatings by UV curing and crosslinking the ethylenic unsaturated groups present.

Electrically conductive materials such as, for example, carbon black, metal salts, conductive polymers, and conductive plasticizers, may be added to the release layer to adjust its conductivity as desired.

After constructing the belt, the polymer layers are dried to remove any solvent and the belt is cured by heat, by a catalyst, by an energy source as UV light, or any suitable means for curing polymers.

The resulting image transfer belt exhibits a volume resistivity ranging from $1\times10^{3}$ to $1\times10^{11}$ ohm-cm. For example, when using a 4-mil (0.1 mm) PET base layer having a volume resistivity greater than $1\times10^{13}$, a thin conductive layer (between about 0.05 and about 1 mil), and a 12 mil (0.3 mm) compliant layer comprising a rubber having a volume resistivity of about $3\times10^{8}$, the resulting belt exhibits a volume resistivity of about $9\times10^{10}$ ohm-cm. An example of a belt having these properties may comprise a DuPont Mylar 0.00092 inch thick EL/C polyethylene terephthalate base film having a volume resistivity of $1\times10^{18}$ ohm-cm, and a 4 to 6 micron conductive layer of Lord Chemlok 233X primer having a volume resistivity of $9\times10^{9}$ ohm-cm, a conductive saturating rubber used to fill the perforated film, and a compliant layer based on a nitrile rubber such as Nipol® from Zeon filled with a conductive additive having a volume resistivity of $3\times10^{8}$ ohm-cm.

It should be appreciated that the resistivity of the image transfer belt may be controlled/varied, depending on the desired application. For example, belts used for latent image recording, intermediate image transfer, or fusing have different electrical requirements which are dependent on the designs of the printers in which they are installed.

In order that the invention may be more readily understood, reference is made to the following examples which are intended to illustrate embodiments of the invention, but not limit the scope thereof.

Example 1

Perforations were made in samples of polyethylene terephthalate (PET) film having a thickness of about 4 mils using a rubber pinning roller (1000 pins/in.$^2$ and 0.008 inch diameter, creating pores comprised of simple circular-shaped holes via penetration of the tapered metal pins on the roller through the film). The PET film was provided with a temporary rubber backing to aid in penetration. The pinning roller was rolled over the entire surface several times until a pore density of about 90 pores/cm$^2$ was achieved. An open pore diameter of about 10 to 25 microns was observed. Protrusions from the film resulting from the rolling process were removed by sanding with a medium grit abrasive. The perforated film was then cleaned and dried.

A conductive primer (Chemlok® 233X, a reactive adhesive containing carbon black dissolved in organic solvents and commercially available from Lord Corporation of Cary, N.C.) was applied with a brush on the first surface of the base film layer, with some primer flowing through the pores to wet part of the second surface of the film. The primer was then dried.

A rubber formulation comprising a blend of nitrile rubber and epichlorohydrin rubber (ECO) was calendered into a thin sheet and applied to the primer coated film. This layup was then vulcanized at approximately 300° F. in a hot press, to a total sandwich gauge of about 0.016 inches.

The resulting electrical performance of the belt was similar to other commercially available products formulated with controlled conductivity polyimide film.

The results are shown in Table 1 below.

TABLE 1

| | |
|---|---|
| Volume Resistivity | $8.6\times10^{10}$ ohm-cm |
| Lower Surface Resistivity | $4\times10^{9}$ ohm/sq. |

Commercially available polyimide films range in volume resistivity from $1\times10^{7}$ to $3\times10^{12}$ and range in surface resistivity from $6\times10^{6}$ to $1\times10^{13}$. Intermediate image transfer belts produced from polyimide film including a conductive compliant layer for use in electrographic printers have exhibited a volume resistivity ranging from about $2\times10^{8}$ to about $7\times10^{11}$ and a surface resistivity ranging from about $5\times10^{8}$ to about $2\times10^{9}$.

Example 2

A perforated film was produced as described in Example 1 above. A rubber cement comprising a conductive rubber comprised of a blend of nitrile rubber and ECO dissolved in an organic solvent (toluene) was applied to the perforated film such that some of the cement flowed through the pores to the other side of the film. A compliant layer of the same rubber cement from Example 1 was applied to the rubber coated film. When the solvent was evaporated and the rubber was vulcanized, the resulting belt structure had properties similar to those in Example 1 suitable for use as a digital intermediate transfer belt. Tensile strength of the rubber/film construction was 30 lbf/inch at a total gauge of 0.016 inches.

Example 3

A reactive two-part urethane prepolymer (Baytec® GSV85A&B available from Bayer) containing conductive additives (Cyastat® LS (3-lauramidopropyl) trimethylammonium sulfate available from Cytec Industries) was applied to a perforated film produced in accordance with Example 1 and cured to produce a belt having a volume resistivity of $3.0\times10^{9}$ ohm-cm at 1000V suitable for use as a digital transfer image transfer belt.

Having described the invention in detail and by reference to preferred embodiments thereof, it will be apparent that modifications and variations are possible without departing from the scope of the invention.

What is claimed is:

1. An image transfer belt for digital printing applications comprising:

a base layer comprising at least one porous film having first and second surfaces and having a plurality of pores therein, wherein at least a portion of said pores completely extend through the thickness of said film;

an electrically conductive polymer layer in direct contact with said first surface of said base layer which fills said pores to form a conductive path from said first surface to said second surface of said film; wherein said electrically conductive polymer layer forms a substantially continuous layer on said first surface of said base layer; and a compliant layer over said electrically conductive polymer layer; wherein the base layer, the electrically conductive polymer layer and the compliant layer are co-extensive.

2. The image transfer belt of claim 1 wherein said electrically conductive polymer layer forms a substantially continuous layer on said second surface of said base layer.

3. The image transfer belt of claim 1 wherein said base layer comprises a material selected from the group consisting of polyester, polyethylene, polypropylene, polyethylene terephthalate, polyethylene naphthalate, polyethylene imine, polyphenylene sulfide, nylon, polyimide, polycarbonate, and polyetherimide.

4. The image transfer belt of claim 1 wherein said base layer comprises multiple layers of porous film.

5. The image transfer belt of claim 1 wherein said electrically conductive layer comprises an elastomer or thermoplastic polymer.

6. The image transfer belt of claim 5 wherein said electrically conductive layer includes an electrically conductive additive therein.

7. The image transfer belt of claim 5 wherein said electrically conductive layer comprises an inherently electrically conductive material.

8. The image transfer belt of claim 1 wherein said electrically conductive layer or said compliant layer comprises a material selected from the group consisting of silicones, rubbers, polyurethanes, fluorosilicones, fluorocarbons, EPDM, ethylene-propylene copolymers, elastomers, and blends thereof.

9. The image transfer belt of claim 1 wherein said compliant layer comprises an inherently electrically conductive material.

10. The image transfer belt of claim 1 wherein said compliant layer includes an electrically conductive additive therein.

11. The image transfer belt of claim 1 wherein said base layer has a thickness of about 0.001 to about 0.010 inches (about 0.025 to about 0.250 mm).

12. The image transfer belt of claim 1 wherein said compliant layer has a thickness of between 0.003 to about 0.025 inches (about 0.08 and 0.64 mm).

13. The image transfer belt of claim 1 wherein said pores in said base layer have a pore density of between about 40 to 200 pores/$cm^2$.

14. The image transfer belt of claim 1 wherein said pores have a pore diameter from about 10 to 200 microns.

15. The image transfer belt of claim 1 wherein said pores comprise perforations or microperforations.

16. The image transfer belt of claim 1 further including a release layer over said compliant layer.

17. The image transfer belt of claim 16 wherein said release layer comprises a fluoropolymer resin or a silicone resin.

18. The image transfer belt of claim 1 having a volume resistivity of between about $1\times10^3$ and $1\times10^{11}$ ohm-cm.

19. The image transfer belt of claim 1 wherein said belt is seamless.

20. A method of making an image transfer belt for digital printing applications comprising:

providing a base layer comprising at least one film having first and second surfaces;

perforating said base layer to provide a plurality of pores therein, wherein at least a portion of said pores completely extend through the thickness of said film;

providing an electrically conductive polymer layer in direct contact with said first surface of said base layer which fills said pores to form a conductive path from said first surface to said second surface of said film; wherein said electrically conductive polymer layer forms a substantially continuous layer on said first surface of said base layer; and providing a compliant layer over said conductive layer; wherein the base layer, the electrically conductive polymer layer and the compliant layer are co-extensive.

21. The method of claim 20 further including providing a release layer over said compliant layer.

* * * * *